United States Patent

United States Patent
Sagane et al.

[15] 3,673,129
[45] June 27, 1972

[54] SYNTHETIC RESIN MULTICELLULAR PRODUCT WHOSE MAIN COMPONENT IS ACRYLONITRILE AND PROCESS FOR PREPARATION THEREOF

[72] Inventors: Norio Sagane, Kyoto; Issei Kuwazuru; Isao Kaetsu, both of Osaka-fu, all of Japan

[73] Assignee: Sekisui Kagaku Kogyo Kabushiki Kaisha

[22] Filed: Dec. 19, 1969

[21] Appl. No.: 882,783

Related U.S. Application Data

[63] Continuation of Ser. No. 603,777, Dec. 22, 1966, abandoned.

[30] Foreign Application Priority Data

Dec. 24, 1965 Japan....................................40/79981

[52] U.S. Cl. ................260/2.5 R, 204/159.22, 260/85.5 ES, 260/85.5 AM
[51] Int. Cl. ......................C08f 47/10, C08j 1/20, C08j 1/22
[58] Field of Search ......................................260/2.5 B, 2.5 R

[56] References Cited

UNITED STATES PATENTS

| | | | |
|---|---|---|---|
| 2,634,243 | 4/1953 | Glenn | 260/2.5 |
| 3,288,731 | 11/1966 | Ingram et al. | 260/2.5 B |
| 3,304,274 | 2/1967 | Eng | 260/2.5 B |
| 3,513,112 | 5/1970 | Kanai et al. | 260/2.5 |

FOREIGN PATENTS OR APPLICATIONS

| | | | |
|---|---|---|---|
| 1,368,383 | 6/1964 | France | 260/2.5 N |

*Primary Examiner*—Murray Tillman
*Assistant Examiner*—Morton Foelak
*Attorney*—Wenderoth, Lind & Ponack

[57] ABSTRACT

Process for preparing multicellular products which comprises mixing urea and/or a urea derivative, and an acid with a monomeric mixture comprising 60-95 percent by weight of acrylonitrile and 40-5 percent by weight of a vinyl monomer copolymerizable with acrylonitrile, polymerizing the mixture with the use of catalyst and/or by irradiation, and thereafter heating the resulting polymer at 100°-250° C.; and multicellular products produced by the above process, in which fine cells having an average diameter of less than 1.0 mm are substantially uniformly dispersed in the polymer and which product has a specific gravity of less than 0.3 g/cm$^3$.

8 Claims, No Drawings

SYNTHETIC RESIN MULTICELLULAR PRODUCT WHOSE MAIN COMPONENT IS ACRYLONITRILE AND PROCESS FOR PREPARATION THEREOF

This application is a continuation of Ser. No. 603,777, filed Dec. 22, 1966, now abandoned.

This invention relates to a synthetic resin multicellular product whose main component is acrylonitrile and a process for the preparation thereof.

By the conventional processes for the preparation of multicellular products, various synthetic resin multicellular products such as phenol resin, urea resin, polyurethane resin, epoxy resin, silicone resin, natural rubber, cellulose acetate, polyethylene and vinyl resins such as polystyrene, polyvinyl chloride and polyvinyl formal have been prepared.

And these synthetic resin multicellular products have been put on the market in soft, semihard and hard forms having continuous foam and discontinuous foam and broadly used in the fields of building material and packing material.

As processes for the preparation of such synthetic resin multicellular products, the following processes are well known.

1. A process of foaming a molten resin or a suspension or solution of a resin or introducing a gas with mechanical stirring and fixing bubbles by the action of heat or a catalyst.
2. A process of dissolving a proper volatile substance in a resin composition, thereafter raising the temperature or raising the temperature and reducing the pressure thereby gasifying the volatile substance into a gaseous or vapor state and changing the resin composition into a foaming structure, thereafter fixing bubbles by cooling or chemical action.
3. A process of retaining a discharged gas inside a resin composition by chemical reaction between or among the components of a resin-forming composition or heat decomposition of a decomposition-type blowing agent accompanied by generation of gas.

In spite of the fact that various synthetic resin multicellular products and processes for the preparation thereof are known as such, it is worthy of attention that a synthetic resin multicellular product whose main component is acrylonitrile has not been known.

Polyacrylonitrile is almost insoluble in an ordinary organic solvent, and when heated it is not melted and softened, but discolored and decomposed and cannot be made a softened state suitable for shaping and processing ordinary thermoplastic resins, there being no proper foaming process, because of that despite its various characteristics such as excellent chemical resistance, water resistance, heat resistance and mechanical strength concurrently and inherently possessed by polyacrylonitrile, it has not been utilized in the preparation of a multicellular product.

With a view to solving these difficulties in shaping and processing polyacrylonitrile thereby obtaining a synthetic resin maintaining excellent chemical resistance, heat resistance and mechanical strength, attempts have been made to obtain synthetic resins by copolymerizing acrylonitrile with various other vinyl monomers, however, a copolymer whose main component is acrylonitrile is, similar to polyacrylonitrile, discolored and decomposed when heated and it is difficult to make the copolymer into a softened state suitable for shaping and processing. This inclination increases as the content of acrylonitrile in the copolymer components increases. In fact, when the content of acrylonitrile became more than 60 percent by weight, it has been almost impossible to make the polymer into a softened state suitable for shaping and processing.

Due to such difficulties, it was not possible to uniformly mix a blowing agent in the resin or foam the resin by heating, and as a multicellular product having acrylonitrile as a component, an acrylonitrile-styrene-butadiene copolymer and acrylonitrile-styrene copolymer whose acrylonitrile component are little, are known.

An object of this invention is to provide a novel synthetic resin multicellular product whose main component is acrylonitrile.

Another object of this invention is to provide a synthetic resin multicellular product having excellent heat resistance and chemical resistance not obtained by the conventional thermoplastic resin multicellular product and having an excellent mechanical strength not obtained by the conventional thermo-setting resin multicellular product.

A further object of this invention is to provide a multicellular product having fine cells and a good water resistance.

A still further object of this invention is to provide a multicellular product whose cutting processability has been improved.

One of other objects of this invention is to provide a multicellular product having little discoloring and a large foaming magnification.

Another of other objects of this invention is to provide a process for the preparation of the aforementioned multicellular product.

Other objects and advantages of this invention will become apparent from the following explanation in detail.

The copolymer components of the synthetic resin multicellular product of this invention consists of (a) 60–95 percent by weight of acrylonitrile, and (b) 40–5 percent by weight of a vinyl monomer copolymerizable with acrylonitrile, especially such vinyl monomer as methyl methacrylate, methyl acrylate, styrene, vinyl acetate, methacrylamide and acrylamide, in said copolymer fine cells whose average diameter is below 1.0 mm are substantially uniformly dispersed, said multicellular product has a specific gravity of below 0.3.

Such multicellular product is obtained by a process which comprises adding urea or a urea derivatives and an acid, preferably water also to a mixture of 60–95 percent by weight of acrylonitrile and 40–5 percent by weight of a vinyl monomer copolymer copolymerizable with acrylonitrile uniformly to mix the all, followed by polymerization by a catalyst or an ionizing radiation to prepare a foamable polymer, thereafter heating the polymer to 100°–250° C., preferably 150°–200° C.

A vinyl monomer copolymerizable with acrylonitrile as referred to in this invention points to at least one monomer selected from the class of vinyl monomers each having one vinyl group. And as such monomer, there may be cited, for instance, methacrylic acid ester, acrylic acid ester, methacrylic acid, acrylic acid, acrylamide, methacrylamide, methacrylonitrile, crotonitrile, styrene, styrene derivative, vinyl acetate and aryl ester.

The properties of a multicellular product obtained by the process of this application vary depending upon the kind of such vinyl monomer, and a vinyl monomer such as methacrylic acid ester, acrylic acid ester and vinyl acetate will give a finely foamed multicellular product with little discoloring having a good water resistance.

A vinyl monomer such as styrene and vinyl toluene will give a multicellular product of somewhat large cells having excellent cutting processability by machines. And when acrylamide or methacrylamide is used, it will remarkably prevent discoloring of a multicellular product and a multicellular product having a large foaming magnification and excellent heat resistance and mechanical strength is obtained.

Acrylic acid and methacrylic acid will give a multicellular product having a large foaming magnification similar to acrylamide and methacrylamide, however, the multicellular product becomes inferior in water resistance. Generally, a hydrophilic vinyl compound such as acrylic acid and methacrylic acid having such property as mentioned above, in order to prepare a multicellular product required to be water resistant, hydrophilic vinyl monomers are undesirable except acrylamide and methacrylamide and it is better to use hydrophobic vinyl monomers.

In order to obtain a multicellular product having a large foaming magnification as well as excellent heat resistance and water resistance, combination of methyl methacrylate and small amount of acrylamide will give a good result.

In this invention, a vinyl monomer copolymerizes with acrylonitrile to form a copolymer containing therein urea or a urea derivative, an acid and water. When this copolymer is foamed by heating to prepare a multicellular product, the vinyl monomer plays a useful role of making the copolymer into such a softened state as is capable of expending without substantially decomposing the copolymer. When the amount of a vinyl monomer is made below 5 percent by weight, at the time of heating and foaming, the copolymer is remarkably discolored and decomposed and a multicellular product having a large foaming magnification is not obtained. On the other hand, when the amount of a vinyl monomer is made above 40 percent by weight, a multicellular product will be inferior in heat resistance and chemical resistance and not greatly different from the conventional thermoplastic resin multicellular product. Therefore, both of the two instances will not enable one to achieve the object of this application.

From the foregoing reasons, in this invention when the content of acrylonitrile is made 60–95 percent by weight, a good multicellular product can be obtained.

In this invention, urea or urea derivatives are used as blowing agent. As urea derivatives, urea derivatives represented by the general formula $H_2NCONHR$ (wherein R stands for alkyl, cycloalkyl, acyl and phenyl groups) may be cited. As such urea derivatives, there may be cited, for instance, a N-monoalkyl substituted product such as $H_2NCONHC_2H_5$ and $H_2NCONHC_3H_7$, a N-monocycloalkyl substituted product such as

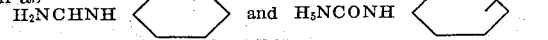

a N-monoacyl substituted product such as
$H_4NCONHCOCH_3$ and $H_2NCONHCOC_2H_5$
and a N-monophenyl substituted product such as

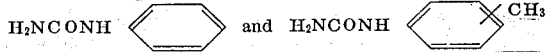

It is also possible to use one or more substances selected from the group consisting of urea and urea derivatives. The mixing ratio of urea or urea derivatives to the monomer mixture of the aforementioned ratio is properly selected in accordance with the properties and foaming magnification of the objective multicellular product, and not particularly decided, however, it is preferable to make the content of urea or urea derivatives of the entire components within the range of 2–15 percent by weight.

Urea or urea derivatives or their aqueous solution cannot be dissolved in the monomer mixture of the aforementioned ratio. When urea is polymerized without being dissolved, but in a dispersed state, and then made a multicellular product, cells will become non-uniform and large with a result that no good multicellular product is obtained. When urea or urea derivatives are mixed with the monomer mixture of said ratio together with an acid, said acid will not destroy the function of the urea or urea derivatives as a blowing agent and it is possible to dissolve the urea or urea derivatives with the monomer and make the entire mixture a uniform composition.

Heretofore, as decomposition-type blowing agent, ammonium carbonate, ammonium bicarbonate, sodium bicarbonate, a metal halide, a metal azid diazoaminobenzene, PP'-oxybisbenzenesulfonyl hydrazide, NN'-dinitrosopentamethylenetetramine and azodicarbonamide have been known.

However, it is difficult to homogeneously dissolve these blowing agents in acrylonitrile, and even if these blowing agents are used in the process for the preparation of this invention, foaming will become non-uniform and they do not give a good multicellular product. And as in this invention, when an acid is added each of these blowing agents will be decomposed immediately and the role as a blowing agent will not be played after the polymerization.

As an acid used in this invention, inorganic acid and organic acid ordinarily used are usable, however, preferably an acid being non-volatile at room temperature under atmospheric pressure having a dissociation constant of above $10^{-5}$ is usable. As such preferable acid, there may be cited such inorganic acid as sulfuric acid, nitric acid, phosphoric acid and pyrophosphoric acid and such organic acid as formic acid, acetic acid, propionic acid, n-butyric acid, iso-butyric acid, caproic acid, glycolic acid, chloropropionic acid, monochloroacetic acid, trichloroacetic acid, lactic acid, trichlorolactic acid, benzoic acid, salicylic acid, dioxybenzoic acid, cyclohexyl carboxylic acid, toluic acid, benzenesulfonic acid, phenolsulfonic acid and toluene-sulfonic acid may be cited. Especially, sulfuric acid, phosphoric acid, pyrophosphoric acid, formic acid, acetic acid, propionic acid and benzoic acid are preferable.

When sulfuric acid and formic acid are used, foaming magnification of a multicellular product is increased and it is possible to make a multicellular product having fine foams. The use of phosphoric acid is effective to make a multicellular product non-inflamable.

In this invention, an acid works effectively for uniformly and homogeneously dissolve urea and urea derivatives in the monomer mixture of said ratio without damaging properties of the urea of urea derivatives as blowing agent, and the mixing amount of the acid is decided depending upon the mixing amount of the urea or urea derivatives. The acid is added in an amount necessary for dissolving urea or urea derivatives in the monomer or an amount exceeding said amount. However, when the amount of the acid becomes too large, it is undesirable because the obtained multicellular product becomes brittle as a result. Preferably, the amount of the acid is within the range of 10–45 percent by weight based on the entire components.

In this invention, a mixed composition of acrylonitrile, a vinyl monomer copolymerizable with acrylonitrile, urea or urea derivatives and an acid may be copolymerized, however, water may be further added. When water is added, it is possible to increase the foaming magnification of the obtained multicellular product and lessen discoloring of the multicellular product due to heat decomposition.

The reason why foaming magnification is increased and discoloring can be prevented when water is added, is not clear, however, it is considered that water assists decomposition of urea or urea derivatives at a foaming temperature and a part of nitrile group (—CN) in the copolymer is converted to amide group (—CONH$_2$) due to coexistence with water thereby discoloring of the multicellular product is prevented.

The adding amount of water is properly selected in accordance with the properties of the desired multicellular product. However, when the adding amount of water becomes excess, water is not homogeneously dissolved in said mixed composition, therefore, it is necessary to add a water in an amount in such range within which water is homogeneously dissolved in said mixed composition. Even when a large amount of water is added, an acid being further added, it is possible to homogeneously dissolve them in said mixture, however, in that case, foams of the obtained multicellular product becomes rough, the multicellular product becoming brittle and weak in water resistance, therefore, it is not desirable.

Therefore, it is preferable to make the adding amount of water below 10 percent by weight based on the entire components.

Also in the composition, filler, dyestuff, pigment and discoloring prevention agent may be properly mixed.

In the process of this invention, a mixed composition, as mentioned above, of acrylonitrile, vinyl monomer copolymerizable with acrylonitrile, urea or urea derivatives, an acid and water if necessarily is polymerized and made a foamable polymer.

As a process for the polymerization, a process generally used for polymerization of a monomer may be properly adopted and a process for the catalytic polymerization, a process for the radiation polymerization and conjoint use of a process for the catalytic polymerization and a process for the radiation polymerization are preferably usable.

Upon carrying out catalytic polymerization, an ordinarily used polymerization initiator is usable, and a catalyst such as azobisisobutylonitrile and benzoyl peroxide and a polymerization initiator of the redox system are preferable.

As such polymerization initiator of the redox system, a polymerization initiator consisting of combination of benzoyl peroxide, t-butylhydroperoxide and decumyl peroxide with N,N'-dimethylaniline, nitrotryspropionamide, dimethylaminopropionitrile, sodium ascorbate triethylamine and triethanolamine are preferably usable.

Also upon carrying out catalytic polymerization, a process wherein at first polymerization is carried out at a temperature below 40° C. until the composition becomes solid state, thereafter the temperature is raised to above 40° C. thereby completing the polymerization is preferable.

In case the volume of a polymer is large, when a polymerization process of the radiation polymerization or conjoint use of catalytic polymerization and radiation polymerization is used, control of polymerization heat becomes easy and it is possible to carry out a polymerization at a low temperature.

A polymer obtained by such polymerization process contains therein urea or urea derivatives, an acid and water uniformly and integrally, being preferable to make a multicellular product by heating per se to foam.

However, in the case of improper mixing ratio of urea or urea derivatives with an acid or unsuitable polymerization conditions, sometime bubbles are brought about in the polymer. The bubbles make a multicellular product non-uniform and its decreases a good property of a multicellular product when the polymer is heated to prepare a multicellular product later. In order to prevent such harmful bubbles from being brought about, it is effective to add dimethyl formamide or dimethyl sulfoxide in a small amount to the components. However, if the amount becomes excess, it will make the heat resistance of the multicellular product bad.

In order to foam a polymer obtained by said polymerization process and make a multicellular product, the polymer is heated to such a temperature at which the polymer expands by a generated gas without substantially decomposing. It is preferable to make the heating temperature 100–250° C., preferably 150°–200° C.

By heating the urea or urea derivatives in said polymer decomposes, generating gas. The polymer reaches a softened state where it expands by a generated gas and comes to form a multicellular product. The acid and water in said polymer help decomposing urea or urea derivatives and prevent the polymer from discoloring by decomposition, making it possible to prepare a multicellular product whose main component is acrylonitrile.

In the process of this invention by using an acid together with blowing agent it is possible to uniformly and homogeneously dissolve a blowing agent in a mixture of acrylonitrile and a vinyl monomer copolymerizable with acrylonitrile without destroying the function as a blowing agent. Because polymerization is carried out after uniformly dissolving a blowing agent in a monomer and polymers so obtained include finely dispersed blowing agent, it is possible to make a multicellular product having a homogeneous fine cell whose diameters are below 0.001 mm.

In accordance with the process for the preparation of this invention, foaming is effected by heating the polymer to a temperature suitable for foaming in the presence of an acid and water, therefore, decomposition discoloring of acrylonitrile can be prevented and it is possible to make a multicellular product have a good appearance.

Also because the multicellular product of this invention consists of acrylonitrile as its main component, it is excellent in heat resistance enduring the constant temperature of 160°–180° C., also excellent in water resistance, chemical resistance and mechanical strength.

Next, Examples of this invention will be shown. Parts in Examples mean parts by weight.

EXAMPLE 1

One hundred parts of acrylonitrile, 50 parts of methyl methacrylate, 15 parts of urea, 31 parts of benzoic acid and 24 parts of monochloroacetic acid were mixed and stirred to obtain a uniform transparent solution.

After polymerizing this solution by radiating $5.9 \times 10^6$ roentgens of a gamma ray (cobalt 60) having a strength of $4.7 \times 10^4$ reontgens/hour, the so obtained polymer was heated at 180° C. for 15 minutes, as a result 20-time expanded yellow colored multicellular product was obtained.

This multicellular product had an average cell diameter of 0.89 mm and a specific gravity of 0.06.

When this multicellular product was used for a long period of time at 160° C., it did not shrink, being excellent in heat resistance.

EXAMPLE 2

One hundred parts of acrylonitrile, 50 parts of methyl methacrylate, 15 parts of urea and 33 parts of glacial acetic acid were mixed to obtain a uniform transparent solution.

After polymerizing this solution by irradiation a dose of $5.9 \times 10^6$ roentgens of a gamma ray having a dose rate of $4.7 \times 10^4$ roentgens/hour, and heating the so obtained polymer lump in a constant temperature over at 180° C. for 15 minutes, a 25-time expanded light yellow multicellular product was obtained.

This multicellular product had an average cell diameter of 1.0 mm and a specific gravity of 0.048.

EXAMPLE 3

One hundred parts of acrylonitrile, 40 parts of methyl methacrylate, 5 parts of urea, 17.2 parts of a 95 percent sulfuric acid were mixed to obtain a transparent solution.

To this solution, 0.5 percent by weight based on this solution each of benzoyl peroxide and N,N'-dimethylaniline was added and polymerization was carried out at 35° C. for 12 hours in a polymerization vessel having an internal capacity of 20 mm × 240 mm × 300 mm to obtain a polymer of a size of 15 mm × 240 mm × 300 mm.

Thereafter, when this copolymer was heated in a constant temperature oven at 190° C. for 15 minutes, a light yellow fine foamed multicellular product having a specific gravity of 0.037, a foaming magnification of 32 times, and an average cell diameter of 0.01 mm was obtained.

This multicellular product had excellent mechanical strengths of a bending strength of 10 kg/cm$^2$, a tensile strength of 13 kg/cm$^2$ and a 50 percent compressed strength of 8 kg/cm$^2$, at the same time, exhibiting a high heat resistance of enduring a long use at 160° C.

EXAMPLE 4

One hundred parts of acrylonitrile, 40 parts of methyl methacrylate, 5 parts of urea, 27 parts of trichloroacetic acid, 5 parts of a 85 percent phosphoric acid and 4 parts of water were mixed to obtain a transparent solution.

To this solution, 1 percent by weight based on this solution each of tertiary butylhydroperoxide and N,N'-dimethylaniline was added, polymerization was carried out at 40° C. for 16 hours and at 50° C. for 10 hours, and the obtained polymer was foamed by heating at 190° C. to obtain a 35-time expanded light yellow multicellular product having a fine cell structure.

This multicellular product had an average cell diameter of 1 mm and a specific gravity of 0.034.

EXAMPLE 5

One hundred parts of acrylonitrile, 40 parts of methyl methacrylate, 5 parts of urea, 20 parts of benzoic acid and 10 parts of a 70 percent n-lactic acid aqueous solution were mixed to obtain a transparent solution.

To this solution a dose of 2 × 10⁶ roentgens of a gamma ray having a dose rate of 1 × 10⁵ roentgens/hour was irradiated, and the obtained polymer lump was heated to 200° C. to foam and a light yellow multicellular product having fine cells were obtained.

The properties of this multicellular product were almost same as those of what was obtained in Example 3.

EXAMPLE 6

One hundred parts of acrylonitrile, 40 parts of methyl methacrylate, 10 parts of phenylurea, 7.5 parts of a 95 percent sulfuric acid and 10 parts of a 50 percent benzenesulfonic acid aqueous solution were mixed to obtain a transparent solution.

Polymerization was carried out by irradiating a dose of 3.5 × 10⁶ roentgens of a gamma ray having a dose rate of 1 × 1⁵ roentgens/hour, the obtained polymer was heated to 200° C. and a light yellow multicellular product having a fine cell structure, a specific gravity of 0.04, a foaming magnification of 30 times and an average cell diameter of 0.01 mm. was obtained.

EXAMPLE 7

One hundred parts of acrylonitrile, 25 parts of methyl methacrylate, 15 parts of styrene, 10 parts of urea, 34 parts of a 95 percent sulfuric acid, 3 parts of water and 20 parts of a 85 percent phosphoric acid were mixed, to obtain a transparent solution, 1 percent of benzoyl peroxide and 1 percent of N,N'-dimethylaniline by weight based on said solution were added to the obtained transparent polymer. Polymerization was carried out at 40° C., thereafter the obtained polymer was heated to 180° C. to foam, and a multicellular product having a foaming magnification of 42 times was obtained.

This multicellular product had a specific gravity of 0.02 and an average cell diameter of 0.028 mm.

This multicellular product had a very excellent cutting processability similar to that of ordinary lumber, ordinary wood-working machines.

EXAMPLE 8

One hundred parts of acrylonitrile, 30 parts of methyl acrylate, 20 parts of vinyl toluene, 35 parts of a 95 percent sulfuric acid, 5 parts of urea and 5 parts of cresol were mixed, to the obtained transparent solution a dose of 2.5 × 10⁶ roentgens of a gamma ray having a dose rate of 1 × 10⁵ roentgens/hour were irradiated to carry out polymerization. When the obtained polymer was heated at 180° C. for 30 minutes, an about 23-time expanded light yellow multicellular product was obtained. This multicellular product had cell diameters of 0.05–0.1 mm and a specific gravity of 0.052.

EXAMPLE 10

One hundred parts of acrylonitrile, 20 parts of butyl acrylate, 20 parts of vinyl acetate, 35 parts of a 95 percent sulfuric acid, 5 parts of urea and 5 parts of cresol were mixed and homogeneously dissolved. Thereafter, to this mixed solution a dose of 3.0 × 10⁶ roentgens of a gamma ray having a strength of 1.0 × 10⁵ roentgens/hour emitted from cobalt 60 source were irradiated to carry out polymerization, thereafter, when the obtained polymer was heated at 170° C. for 20 minutes, a light yellow multicellular product expanded about 17 times having a specific gravity of 0.08 and cell diameters of 0.1–0.3 mm was obtained.

EXAMPLE 11

One hundred parts of acrylonitrile, 15 parts of methyl methacrylate, 50 parts of a 95 percent sulfuric acid and 5 parts of urea were mixed and homogeneously dissolved, thereafter the mixed solution was irradiated with a dose of 2.0 × 10⁶ roentgens of a gamma ray having a strength of 1 × 10⁵ roentgens/hour, whereby it was polymerized. Thereafter, when the obtained polymer was heated at 200° C. for 30 minutes, a yellowish brown multicellular product expanded 5 times having a specific gravity of 0.24 and cell diameters of below 0.05 mm was obtained.

EXAMPLE 12

One hundred parts of acrylonitrile, 10 parts of methyl methacrylate, 30 parts of a 95 percent sulfuric acid, 15 parts of formic acid, 5 parts of urea and 5 parts of cresol were mixed and homogeneously dissolved, thereafter the mixed solution was irradiated with a dose of 2.0 × 10⁶ roentgens of a gamma ray having a strength of 1 × 10⁵ roentgens/hour emitted from cobalt 60 source, whereby it was polymerized. Thereafter, when the obtained polymer was maintained at a temperature of 200° C. for 30 minutes, a yellowish brown multicellular product expanded 4 times was obtained. This multicellular product had a specific gravity of 0.3 and cell diameters of below 0.05 mm.

EXAMPLE 13

One hundred parts of acrylonitrile, 40 parts of methyl methacrylate, 20 parts of acrylamide, 5 parts of maleic anhydride, 5 parts of urea, 35 parts of a 95 percent sulfuric acid and 25 parts of formic acid were mixed and homogeneously dissolved, thereafter the mixed solution was irradiated with a dose of 2.5 × 10⁶ roentgens of a gamma ray having a strength of 0.5 10⁵ roentgens/hour emitted from cobalt 60 source, whereby it was polymerized. Thereafter, when the obtained polymer was heated at 180° C. for 30 minutes, a white multicellular product expanded about 49 times having a specific gravity of 0.02 was obtained.

EXAMPLE 14

One hundred parts of acrylonitrile, 40 parts of methyl methacrylate, 20 parts of acrylamide, 5 parts of acrylic acid, 5 parts of urea, 40 parts of a 95 percent sulfuric acid and 10 parts of dimethyl formamide were mixed and homogeneously dissolved. Thereafter, the mixed solution was irradiated with a dose of 2.0 × 10⁶ roentgens of a gamma ray having a strength of 0.5 × 10⁵ roentgens/hour emitted from cobalt 60 source, whereby it was polymerized. Thereafter, when the obtained polymer was heated at 180° C. for 30 minutes, a white multicellular product expanded about 53 times was obtained. The multicellular product had a specific gravity of 0.022 and cell diameters of 0.24–0.3 mm.

In order to make clearer the effect of this invention, a case wherein the content of acrylonitrile is more than 95 percent by weight and a case wherein the content of acrylonitrile is less than 60 percent by weight will be shown as Controls.

CONTROL 1

One hundred parts of acrylonitrile, 5 parts of styrene, 15 parts of urea and 40 parts of sulfuric acid were mixed and homogeneously dissolved. Thereafter, the mixed solution was irradiated with a dose of 2.0 × 10⁶ roentgens of a gamma ray having a strength of 5 × 10⁴ roentgens/hour emitted from cobalt 60 source, whereby it was polymerized. Thereafter, when the obtained polymer was heated at 180° C. for 30 minutes, discoloration was remarkable and the polymer hardly expanded.

CONTROL 2

Sixty parts of acrylonitrile, 90 parts of methyl methacrylate, 15 parts of urea and 40 parts of sulfuric acid were mixed and homogeneously dissolved. Thereafter, the mixed solution was irradiated with a dose of 2 × 10⁶ roentgens of a gamma ray having a strength of 5 × 10⁴ roentgens/hour emitted from cobalt 60 source, whereby it was polymerized. Thereafter, when the obtained polymer was heated at 150° C. for 15 minutes, a 20-time expanded multicellular product was obtained.

When this multicellular product was immersed in benzene, it expanded remarkably. When it was heated at 50° C. for 1 hour, it shrank to such an extent where its original shape did not remain and it was recognized that this multicellular product was remarkably inferior in chemical resistance as compared with the multicellular products obtained in the Examples of this invention.

The multicellular products according to the present invention have a wide variety of uses. Thus, inter alia, they can be interposed between plastic plates of ships or rolling stock or reservoir tanks, etc., which are made of fiber-reinforced plastics. They are also suitable for use as such or sandwiched in between plastic plates to form partitions for buildings and the like. They can also be used in ceiling materials and in wall materials in the same way. Othey utilities comprise functioning as substitutes for wooden molds used in casting or vacuum shaping, for floating lids on the liquid surfaces of oil or fuel reservoir tanks and the like; also as artificial "wood" for making stage settings; etc.

what is claimed is:

1. A process for the preparation of a multicellular product which comprises mixing at least one substance selected from the group consisting of $H_2NCONH_2$ and $H_2NCONHR$ wherein R is selected from the group consisting of alkyl, cycloalkyl, acyl and phenyl and at least one acid which is substantially nonvolatile at room temperature under atmospheric pressure and which has a disassociation constant greater than $10^{-5}$ with a monomer mixture consisting essentially of 60–95 percent by weight of acrylonitrile and 40–5 percent by weight of at least one vinyl monomer selected from the group consisting of acrylic acid ester, methacrylic acid ester, and vinyl acetate, polymerizing the entire mixture and thereafter heating the obtained polymer at 100°–250° C to foam the polymer.

2. A process for the preparation of a multicellular product which comprises mixing at least one substance selected from the group consisting of $H_2NCONH_2$ and $H_2NCONHR$ wherein R is selected from the group consisting of alkyl, cycloalkyl, acyl and phenyl, an acid which is substantially nonvolatile at room temperature under atmospheric pressure and which has a disassociation constant greater than $10^{-5}$ and water with a monomer mixture consisting essentially of 60–95 percent by weight of acrylonitrile and 40–5 percent by weight of a vinyl monomer selected from the group consisting of acrylic acid ester, methacrylic acid ester, and vinyl acetate, polymerizing the entire mixture and thereafter heating the obtained polymer at 100°–250° C to form the polymer.

3. A process according to claim 2 wherein the amount of said substance is 2–15 percent by weight and the amount of the acid is 10–45 percent by weight based on the entire mixture before polymerization.

4. A process according to claim 2 wherein said substance is urea.

5. A process according to claim 2 wherein the polymerization is employed using a polymerization catalyst.

6. A process according to claim 2 wherein the polymerization is carried out by irradiating said mixture.

7. A process according to claim 2 wherein the polymerization is carried out using a polymerization catalyst and irradiating the mixture.

8. A process according to claim 2 wherein the acid is at least one substance selected from the group consisting of sulfuric acid, phosphoric acid, pyrophosphoric acid, formic acid, acetic acid, propionic acid and benzoic acid.

* * * * *